March 15, 1938.  G. B. MARKLE, JR  2,111,456
DEVICE FOR HOLDING FOWLS AND THE LIKE
Filed Feb. 11, 1937
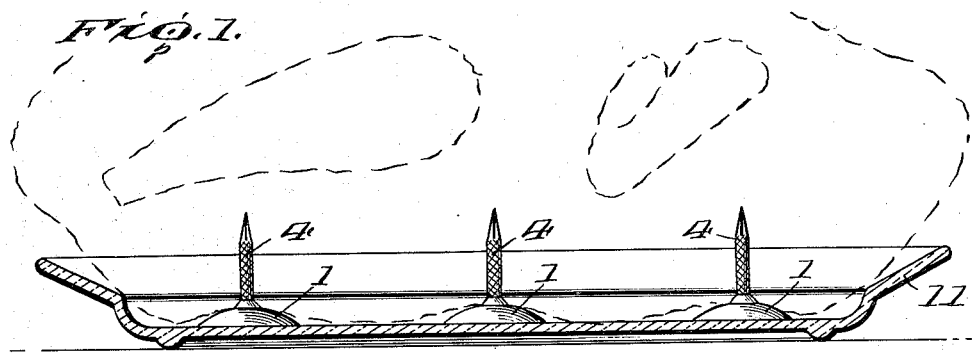
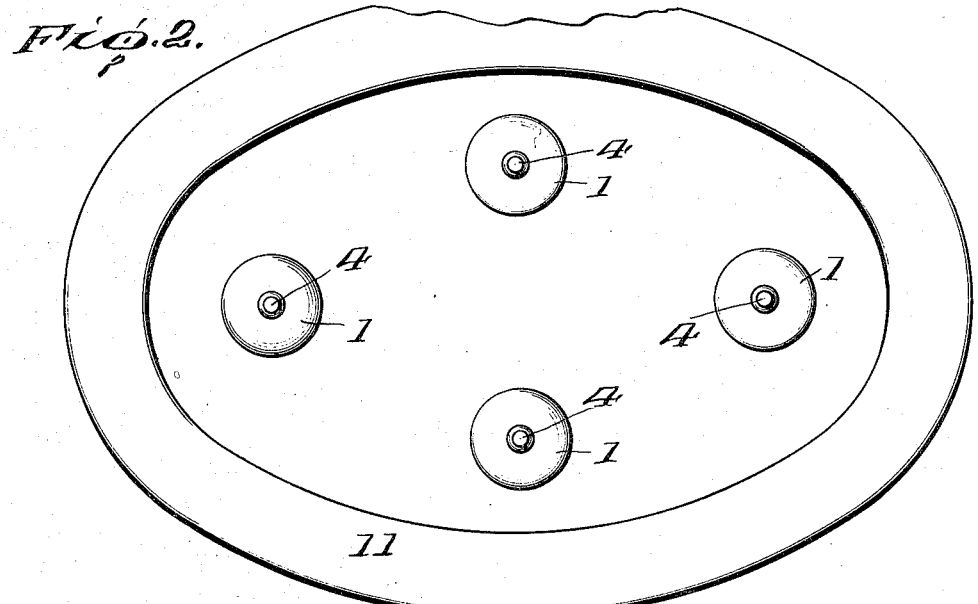
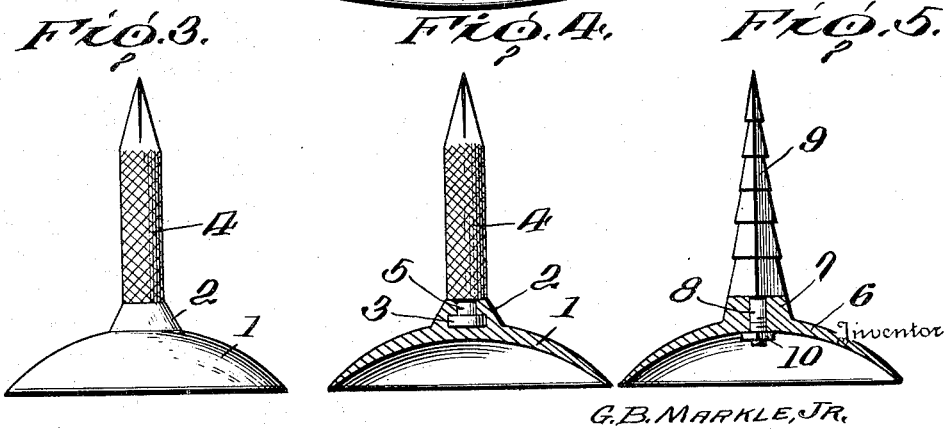
G. B. MARKLE, JR.
By Patterson, Wright & Patterson
Attorneys Patented Mar. 15, 1938

2,111,456

UNITED STATES PATENT OFFICE 2,111,456

DEVICE FOR HOLDING FOWLS AND THE LIKE

George B. Markle, Jr., Hazleton, Pa.

Application February 11, 1937, Serial No. 125,291

4 Claims. (Cl. 65—12)

This invention relates to certain new and useful improvements in a device for holding fowls and other cooked meat on a platter, the object being to provide a device which is exceedingly simple and cheap in construction which can be positioned on the platter at any point desired and will remain in that position so that when a fowl or piece of cooked meat is placed on the device, the fowl or cooked meat will be prevented from moving or changing its position while being carved.

Another object of my invention is to provide a device in the form of a vacuum cup having a pin carried thereby which is adapted to extend into the fowl or meat being carved so as to hold the fowl or meat in its proper position.

Other and further objects and advantages of the invention will be hereinafter set forth and the novel features thereof defined by the appended claims.

In the drawing,

Figure 1 is a longitudinal section through a platter showing a plurality of my devices in position thereon holding a fowl in position to be carved;

Figure 2 is a top plan view of the platter showing one arrangement of the devices on the platter for holding a fowl or piece of meat;

Figure 3 is a side elevation of one of the devices;

Figure 4 is a side elevation showing the vacuum cup in section; and

Figure 5 is a modified form of device showing a different construction of pin and manner of securing the same within the vacuum cup.

In the embodiment of my invention as herein shown I employ a vacuum cup 1 provided with a neck 2 into which is adapted to be molded a base 3 of a knurled pin 4 which will readily pierce the fowl or piece of meat when placed thereon and pressure is applied. The base 3 has an annular groove 5 into which the neck 2 of the vacuum cup 1 is molded so as to hold the pin in its proper position within the neck and prevent the same from becoming detached and as the vacuum cup 1 is formed of rubber, a resilient support is provided for a pin.

In the embodiment of my invention as shown in Figure 5, the vacuum cup 6 is provided with a neck 7 having an opening through which extends the threaded stem portion 8 of a pin 9 and on which is mounted a nut 10 for securing the pin in position within the vacuum cup and it is, of course, understood that this construction can be used in connection with a knurled pin if desired without departing from the spirit of my invention.

The pin 9 herein shown is conical in shape and annularly reduced to provide a plurality of truncated cones forming stepped shoulders or barbs which will prevent the pin from being easily withdrawn after being forced into a fowl or piece of meat.

In the use of my device, I preferably have the devices arranged in sets of four and these devices are placed on a platter 10 preferably in position as shown in Figures 1 and 2 and are held in that position by the suction of the vacuum cups so that when a piece of meat or fowl is placed on top of the pins and pressure is applied, the pins will imbed themselves within the fowl or piece of meat so as to hold the same firmly while being carved.

From the foregoing description it will be seen that I have provided a device for holding fowl or other cooked meat which is exceedingly simple and cheap in construction, the same being composed of a resilient base in the form of a vacuum cup carrying a pin for imbedding itself within the fowl or piece of cooked meat to hold it in position upon a platter whereby it can be carved properly and easily without any danger of the powl or piece of meat slipping. The vacuum cup forming the resilient support for the pin will not injure silver or other metal platters whereby the fowl or piece of meat will be held resiliently in position on the platter without any danger of it moving or changing position while being carved.

What I claim is:

1. A device of the kind described comprising a rubber vacuum cup having a neck provided with an opening, a pin having a threaded stem portion extending through the opening of said neck, a nut working on said stem for securing said pin therein, said pin being formed conical in shape and having a plurality of annular stepped shoulders.

2. A device for facilitating the carving of meat, poultry and other articles of food on a dish or the like comprising a vacuum cup for gripping the dish provided with a neck carrying a pointed pin adapted to be embedded in the article of food for holding the same against movement on said dish.

3. A device for facilitating the carving of meat, poultry and other articles of food on a dish or the like comprising a vacuum cup for gripping the dish provided with a neck carrying a knurled pointed pin adapted to be embedded in the article of food for holding the same against movement on said dish.

4. A device for facilitating the carving of meat, poultry and other articles of food on a dish or the like comprising a vacuum cup for gripping the dish provided with a neck carrying a conical shaped pin having a plurality of annularly stepped shoulders adapted to be embedded in the article of food for holding the same against movement on said dish.

GEORGE B. MARKLE, Jr.